(12) United States Patent
Genda

(10) Patent No.: US 11,409,083 B2
(45) Date of Patent: Aug. 9, 2022

(54) COMPOSITE OPTICAL ELEMENT, OPTICAL APPARATUS AND IMAGING APPARATUS

(71) Applicant: CANON KABUSHIKI KAISHA, Tokyo (JP)

(72) Inventor: Hideo Genda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 16/745,857

(22) Filed: Jan. 17, 2020

(65) Prior Publication Data
US 2020/0249473 A1 Aug. 6, 2020

(30) Foreign Application Priority Data

Jan. 31, 2019 (JP) .............................. JP2019-015785
Dec. 10, 2019 (JP) .............................. JP2019-222942

(51) Int. Cl.
| | |
|---|---|
| *G02B 13/00* | (2006.01) |
| *G02B 3/00* | (2006.01) |
| *G02B 7/02* | (2021.01) |
| *G02B 27/00* | (2006.01) |

(52) U.S. Cl.
CPC ............ *G02B 13/006* (2013.01); *G02B 3/00* (2013.01); *G02B 7/025* (2013.01); *G02B 7/028* (2013.01); *G02B 27/0025* (2013.01)

(58) Field of Classification Search
CPC .. G02B 13/006; G02B 13/00; G02B 13/0025; G02B 3/00; G02B 1/041; G02B 27/0025
USPC .............................. 359/796–797; 351/159.62
See application file for complete search history.

(56) References Cited

U.S. PATENT DOCUMENTS

| | | | | | |
|---|---|---|---|---|---|
| 4,268,134 | A | * | 5/1981 | Gulati .................... | G02C 7/102 |
| | | | | | 351/159.62 |
| 4,679,918 | A | * | 7/1987 | Ace ......................... | G02C 7/02 |
| | | | | | 351/159.62 |
| 5,345,337 | A | * | 9/1994 | Sigler ..................... | G02B 3/12 |
| | | | | | 359/796 |

(Continued)

FOREIGN PATENT DOCUMENTS

| | | |
|---|---|---|
| JP | 2010-117472 A | 5/2010 |
| JP | 2016-194609 A | 11/2016 |

OTHER PUBLICATIONS

JP 2010-117472 A, [0003], [0004], U.S. Pat No. 10,185,059 B2, US 2010/0116973 A1, US 2015/0097109 A1, U.S. Pat. No. 8,934,183 B2.
JP 2016-194609 A, [0005], [0006].

*Primary Examiner* — Zachary W Wilkes
(74) *Attorney, Agent, or Firm* — Venable LLP

(57) ABSTRACT

A composite optical element comprises a first base member, an optical resin layer, a bonding layer, and a second base member which are sequentially laminated such that the optical resin layer and the bonding layer are sandwiched between light entering/exiting surfaces of the first base member and the second base member. The thickness of the bonding layer changes along a straight line extending from the center toward the outer periphery of the bonding layer. Specifically, the thickness along the straight line is greater at an intermediate position between a first position and a second position than either of the thicknesses at the first position and at the second position. The first position is apart from the center by 0.8 times of half the diameter of the optical resin layer, and the second position corresponds to the outer periphery of the bonding layer.

11 Claims, 4 Drawing Sheets

(56) References Cited

U.S. PATENT DOCUMENTS

| | | | | |
|---|---|---|---|---|
| 6,816,322 B2* | 11/2004 | Abe | ............... | G02B 7/008 |
| | | | | 359/796 |
| 7,931,833 B2* | 4/2011 | Miyakawa | ....... | B29D 11/00009 |
| | | | | 264/1.32 |
| 8,279,540 B2* | 10/2012 | Ishibashi | .............. | G02B 3/00 |
| | | | | 359/797 |
| 8,934,183 B2 | 1/2015 | Maetaki | | |
| 9,096,026 B2* | 8/2015 | Hall | ............... | B29D 11/0073 |
| 9,696,469 B2* | 7/2017 | Genda | ............... | G02B 5/1866 |
| 10,185,059 B2 | 1/2019 | Maetaki | | |
| 10,365,453 B2* | 7/2019 | Ishibashi | .............. | G02B 6/4212 |
| 10,488,730 B2* | 11/2019 | Kim | ............... | G02C 7/101 |
| 10,681,254 B2* | 6/2020 | Yashima | .............. | G02B 9/12 |
| 11,237,300 B2* | 2/2022 | Yonetani | .............. | G02B 3/00 |
| 2010/0116973 A1 | 5/2010 | Maetaki | | |
| 2010/0321801 A1* | 12/2010 | Tokunaga | ............... | G02B 3/00 |
| | | | | 359/796 |
| 2015/0097109 A1 | 4/2015 | Maetaki | | |
| 2020/0049862 A1* | 2/2020 | Ogane | ............... | G02B 7/028 |
| 2020/0073077 A1* | 3/2020 | Kanzaki | .............. | G02B 1/041 |
| 2020/0158987 A1* | 5/2020 | Chou | ............... | G02B 7/022 |
| 2020/0386914 A1* | 12/2020 | Yonetani | .............. | B29C 43/146 |

* cited by examiner

COMPOSITE OPTICAL ELEMENT, OPTICAL APPARATUS AND IMAGING APPARATUS

BACKGROUND OF THE INVENTION

Field of the Invention

The present invention relates to a composite optical element formed by compositely combining one or more glass-made (or hard plastic-made) base members and resin-made members. More specifically, the present invention relates to a composite optical element comprising a pair of base members, an optical resin layer and a bonding layer, the optical resin layer and the bonding layer being arranged between the pair of base members.

Description of the Related Art

In recent years, in response to a demand for imaging apparatus such as cameras and video cameras with improved performances, optical elements such as lenses for forming optical devises equipped with an imaging optical system are required to exert improved optical functions and show excellent environmental resistance. A known technique of arranging an additional lens in the optical system in order to correct the chromatic aberration that arises due to the use of spherical lenses is being popularly employed in instances where the optical system of an optical devise is formed by using a plurality of lenses.

Japanese Patent Application Laid-Open No. 2010-117472 discloses a composite optical element formed by sequentially laying a first optical element (which is a glass base member), a resin layer formed on the light-entering/exiting surface of the first optical element showing a convex profile, a second optical element (which is a glass base member) having a light-entering/exiting surface showing a concave profile and bonded to the resin layer by way of a bonding layer so as to operate as a lens for correcting chromatic aberration. The resin layer has a film thickness that is uneven and largest at the center and continuously decreases toward the outer peripheral edge thereof. The effect of correcting chromatic aberration of a resin layer having an uneven film thickness rises as the ratio of the largest film thickness at the center to the smallest film thickness at the outer peripheral edge, which ratio is referred to as uneven thickness ratio, is increased. Thus, there is a demand for optical elements having a resin layer that shows a large uneven thickness ratio.

However, in a composite optical element disclosed in Japanese Patent Application Laid-Open No. 2010-117472, its components including a pair of glass base member, a resin layer and a bonding layer are made of different materials and hence their linear expansion coefficients and moduli of elasticity differ from each other. Therefore, as the temperature of the environment surrounding the composite optical element changes, internal distortion arises due to the differences among their thermal expansion coefficients. Particularly, when the resin layer having a large thermal expansion coefficient relative to the glass base members shows a large uneven thickness ratio, the internal distortion will become remarkably large in response to changes in the environmental temperature. Therefore, an optical element disclosed in Japanese Patent Application Laid-Open No. 2010-117472 is accompanied by a problem that the resin layer and the bonding layer become liable to come off from each other when the environmental temperature changes to a large extent.

In view of the above-identified problem, Japanese Patent Application Laid-Open No. 2016-194609 discloses a composite optical element in which the internal distortion that arises between the resin layer and the bonding layer is reduced by reducing the thickness at an outer peripheral part (outer peripheral edge zone) of one of the pair of glass base members to thereby improve its thermal resistance of the composite optical element.

However, while a composite optical element disclosed in Japanese Patent Application Laid-Open No. 2016-194609 can minimize the risk of separation of the resin layer and the bonding layer by raising the flexibility of the base member, the outer peripheral part (outer peripheral edge zone) of the base member having a reduced film thickness becomes an optically ineffective region in the optical system to which the composite optical element belongs. This means that the composite optical element is inevitably made to have a large outer diameter.

The present invention is made in view of the above-described technical background and provides a composite optical element comprising a pair of base members, an optical resin layer and a bonding layer, the optical resin layer and the bonding layer being arranged between the pair of base members, that shows an excellent environmental resistance even when its outer diameter is reduced.

SUMMARY OF THE INVENTION

A composite optical element according to the present invention comprises: a first base member having a light entering/exiting surface extending from a center, the center being aligned with the optical axis of the optical element, to an outer periphery thereof; an optical resin layer extending from the center to an outer periphery thereof; a bonding layer extending from the center to an outer periphery thereof; and a second base member having a light entering/exiting surface extending from the center to an outer periphery thereof; the first base member, the optical resin layer, the bonding layer and the second base member being sequentially laminated in the above-described order; the optical resin layer and the bonding layer being sandwiched between the light entering/exiting surface of the first base member and the light entering/exiting surface of the second base member, wherein the bonding layer has a thickness which changes along a straight line extending from the center toward the outer periphery of the bonding layer, the thickness being greater at an intermediate position located between a first position and a second position than at the first position and at the second position, the first position corresponding to a point apart from the center by 0.8 times a distance to the outer periphery of the optical resin layer from the center, the second position corresponding to the outer periphery of the bonding layer.

Further features of the present invention will become apparent from the following description of exemplary embodiments with reference to the attached drawings.

DESCRIPTION OF THE EMBODIMENTS

Figure 1:
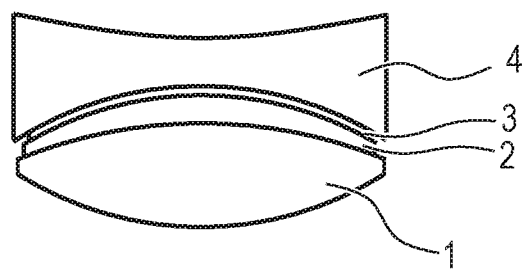
FIG. 1 is a schematic cross-sectional view of a composite optical element according to the present invention.

In a composite optical element, the materials of individual components including glass-made (or hard plastic-made) base members, an optical resin layer and a bonding layer differ from each other and hence the linear expansion coefficients and the moduli of elasticity of these components differ from each other. More specifically, the optical resin layer and the bonding layer are made of resin materials whose linear expansion coefficients show large values and whose moduli of elasticity show small values if compared with the base members that are made of glass (or hard plastic). Therefore, as the environmental temperature changes, while the deformations of the parts of the optical resin layer and those of the bonding layer that are located close to the interfaces with the base members are suppressed by the base members having a small linear expansion coefficient, those of the parts that are located remote from the interfaces with the base members are majorly dominated by their own linear expansion coefficients. Thus, largely deformed parts and slightly deformed parts coexist in the optical resin layer and also in the bonding layer that are sandwiched between the two base members to give rise to internal distortion. Additionally, if the optical resin layer shows a large uneven thickness ratio, the stress produced at the center and the stress produced along the outer periphery thereof show a large difference.

When the stress is observed in the normal direction on the interface between the optical resin layer and the bonding layer, there exist compression stress that forces the two layers to come closer to each other and tensile stress that forces the two layers to go apart from each other. Of these stresses, if the tensile stress exceeds the adhesion of the optical resin layer and the bonding layer along the interface of these two layers, they come to be delaminated from each other. Therefore, it is important to increase the adhesion force along the interface of the two layers and reduce the tensile stress there to prevent delamination of the optical resin layer and the bonding layer from each other.

For instance, in an optical element disclosed in Japanese Patent Application Laid-Open No. 2016-194609, the base member is made to have an outer peripheral zone that shows a small thickness. With such an arrangement, when tensile stress arises along the interface of the resin layer and the bonding layer, the base members will easily be deformed (bent) by the stress to in turn prevent the resin layer and the bonding layer from being delaminated from each other. However, as the thickness of the base members is reduced at the outer peripheral zone thereof, the peripheral areas of the base members that cannot be utilized as optically effective regions increase to give rise to a problem that the outer diameter of the optical element inevitably needs to be increased.

In contrast, a composite optical element according to the present invention that has the above-described configuration can minimize the increase of the outer peripheral areas that cannot be utilized as optically effective regions so that the present invention provides a composite optical element that shows excellent environmental resistance even when it has a small outer diameter.

The present invention provides a composite optical element comprising: a first base member having a light entering/exiting surface extending from a center, the center being aligned with the optical axis of the optical element, to an outer periphery thereof; an optical resin layer extending from the center to an outer periphery thereof; a bonding layer extending from the center to an outer periphery thereof; and a second base member having a light entering/exiting surface extending from the center to an outer periphery thereof; the first base member, the optical resin layer, the bonding layer and the second base member being sequentially laminated in the above-described order; the optical resin layer and the bonding layer being sandwiched between the light entering/exiting surface of the first base member and the light entering/exiting surface of the second base member, wherein the bonding layer has a thickness which changes along a straight line extending from the center toward the outer periphery of the bonding layer, the thickness being greater at an intermediate position located between a first position and a second position than at the first position and at the second position, the first position corresponding to a point apart from the center by 0.8 times a distance to the outer periphery of the optical resin layer from the center, the second position corresponding to the outer periphery of the bonding layer.

Firstly, in a composite optical element according to the present invention, the outer diameter of the optical resin layer is made greater than the outer diameter of the bonding layer and there exists no layer that is formed to adhere to the two base members. Then, as a result, when expansions and compressions take place due to changes in the environmental temperature, there does not arise any stress that concentratedly appears in one single layer of the composite optical element. Therefore, the risk that the layers are delaminated from each other is minimized.

Additionally, in a composite optical element according to the present invention, the thickness He of the bonding layer on the circle centered at the optical axis of the optical element with a diameter equal to 0.8 φr as measured on a straight line extending from the center to the outer peripheral edge thereof, which diameter also corresponds to the outer diameter of the region that is optically utilized (optically effective region), and the thickness Ha of the bonding layer at spots that may or may not continuously arranged on the circle also centered at the optical axis of the optical element with a diameter equal to φa, which circle is found outside the above-defined circle and in the region that is optically not utilized, satisfies the relationship requirement of He<Ha. Since the bonding layer is not optically utilized but arranged only to make the optical resin layer and the second base member adhere to each other, He is required to be made as small as possible (and the bonding layer is required to be made as thin as possible in the optically effective region). If He has a large value (and hence the bonding layer has a large thickness in the optically effective region) and the environmental temperature changes, the composite optical element is deformed and the refractive index of the composite optical element fluctuates to a large extent due to the thermal expansion of the bonding layer to consequently degrade the performance of the optical element. On the other hand, since Ha is made greater than He (and hence the thickness of the bonding layer in the region outside the optically effective region is made greater than the thickness of the bonding layer on the circle having a diameter equal to the outer diameter of the optically effective region), the optical performance of the optical element is maintained to its original high level if the environmental temperature changes and any risk that the layers are delaminated from each other is minimized. This is because the modulus of elasticity of the bonding layer is very small relative to the modulus of elasticity of the base members and that of the optical resin layer and hence the stress that arises in the bonding layer is reduced and/or widely dispersed. Additionally, since the circle whose diameter is equal to ϕa is found in the region that is not optically utilized, the bonding layer does not adversely affect the performance of the optical element even if the bonding layer is made to have a large thickness on the circle.

Furthermore, in a composite optical element according to the present invention, the thickness Hb of the bonding layer on the circle having a diameter equal to ϕb, which diameter ϕb is not greater than the outer diameter ϕg of the bonding layer, and which circle is located outside the circle having the diameter equal to ϕa, satisfies the relationship requirement of Ha>Hb, where Ha is the thickness of the bonding layer on the circle having a diameter equal to ϕa. Note that the thickness of the bonding layer continuously changes from the circle having the diameter of ϕa to the outer peripheral edge (having the outer diameter of ϕg). Therefore, the thickness Ha of the bonding layer on the circle having the diameter of ϕa is greater than the thickness of the bonding layer at the outer peripheral edge thereof. The thickness of the bonding layer is required to be made as large as possible on the circle having a diameter that is equal to ϕa in order to disperse the stress and minimize the risk of delamination. However, if the thick part of the bonding layer continues from the circle having the diameter of ϕa to the outer peripheral edge of the bonding layer that has the diameter of ϕg, moisture can penetrate into the optical element from the outside by a large amount to give rise to a dilation deformation and a reduction of the adhesion on the interface. Then, delamination of the layers of the composite optical element can occur frequently particularly when the optical element is operated for a long period of time because the modulus of elasticity of the bonding layer has a small value and moisture can easily pass through the bonding layer. Thus, the penetration of moisture is reduced and the delamination risk is minimized by reducing the thickness of the bonding layer on a circle that is located outside the circle having the diameter of ϕa and whose diameter is equal to 0, which diameter ϕb is not greater than the outer diameter ϕg of the bonding layer. Incidentally, while in the above, the positions corresponding to the diameters ϕa, ϕb and ϕg are assumed to be located at the same distance from the center in all the directions (i.e. located on a circle) for the convenience of explanation, they may be not exactly the same for all the directions. However, it is preferable to provide the portion having an increased thickness at substantially the same distance for all the directions (i.e. in a ring) because such constitution will disperse stress uniformly.

Note that the effect of preventing delamination from taking place can more reliably be obtained when the thickness of the bonding layer satisfies the requirement of 1.2He<Ha and Ha is greater than 1.2 times of the thickness of the bonding layer at the outer peripheral edge thereof. This is because the stress dispersing effect of the bonding layer is further improved when Ha is greater than 1.2 times of He and the amount of moisture penetrating into the bonding layer from the outside can be reduced more effectively when Ha is greater than 1.2 times of the thickness of the bonding layer at the outer peripheral edge thereof (and hence the thickness of the bonding layer is further reduced from Ha toward the outer peripheral edge of the bonding layer).

Furthermore, the effect of preventing delamination from taking place can more reliably be obtained when the thickness of the bonding layer is not smaller than 1 μm and not greater than 100 μm at any arbitrarily selected point thereof. In other words, when the smallest value of the thickness of the bonding layer is smaller than 1 the bonding layer may sometimes not satisfactorily exert its stress dispersing effect. When, on the other hand, the largest value of the thickness of the bonding layer is greater than 100 the bonding layer expands and contracts to a large extent in response to changes in the environmental temperature to give rise to a risk of adversely affecting the performance of the optical element.

Additionally, the effect of preventing delamination from taking place can still more reliably be obtained when the modulus of elasticity of the bonding layer is not greater than ⅕ of the modulus of elasticity of the optical resin layer. On the other hand, the stress dispersing effect is not satisfactory and the effect of preventing delamination from taking place can hardly be obtained when the modulus of elasticity of the bonding layer is greater than ⅕ of the modulus of elasticity of the optical resin layer.

Now, the present invention will be described by referring to the accompanying drawings that illustrate currently preferable embodiments of the invention. Note, however, that the present invention is by no means limited by the embodiments that will be described below.

[Optical Element]

FIG. 1 is a schematic cross-sectional view of an embodiment of optical element according to the present invention. The optical element of this embodiment comprises a first base member 1 having a light entering/exiting surface showing a convex profile, an optical resin layer 2 formed on the light entering/exiting surface showing a convex profile of the first base member 1 and having an uneven film thickness of decreasing from the center toward the outer periphery thereof, a bonding layer 3 showing a thin film-like appearance and having a substantially uniform film thickness and a second base member 4 bonded to the bonding layer and having a light entering/exiting surface showing a concave profile, the layers being laminated in the above-mentioned order. Light may be made to enter the optical element from either surface side thereof. In other words, light may be made to enter the optical element from the side of the first base member 1 or from the side of the second base member 4.

Materials that can be used to form the first base member 1 and the second base member 4 include not only popular optical glass materials such as silicate glass, borosilicate glass and phosphate glass but also various glass materials such as quartz glass and glass ceramic. Additionally, not only glass materials but also light transmitting (hard) plastic materials can also be used to form the first base member 1 and the second base member 4. The radius of curvature of the convex profile and that of the concave profile can appropriately be selected according to the desired optical performance of the optical element.

The optical resin layer 2 is arranged on the first base member 1. As for the profile of the optical resin layer 2, the optical resin layer 2 has an uneven film thickness that is largest at and near the center thereof and continuously decreasing toward the outer peripheral edge thereof. The film thickness of the optical resin layer 2 is the thickness of the optical resin layer 2 in the surface normal direction relative to the surface of the first base member 1 on which the optical resin layer 2 is formed.

An appropriate material can be selected for the optical resin layer 2 according to the desired optical characteristics of the optical element and those of the optical resin layer 2. Examples of materials that can be used for the optical resin layer 2 include thermosetting resin materials and light curable resin materials. Thermosetting resin materials and light curable resin materials that can be used to form the optical resin layer 2 may contain micro particles in a dispersed state for the purpose of adjusting the optical characteristics of the optical resin layer 2. From the viewpoint of adoptability of a simple manufacturing process, the use of a light curable resin material is preferable. From the viewpoint of capability of obtaining excellent optical characteristics, the use of an acrylic resin material is preferable. Acrylic resin materials that can be used to form the optical resin layer 2 include those obtained by polymerizing or copolymerizing a compound having one or more acryloyl groups and/or methacryloyl groups and expressed by the chemical formula (1) shown below.

Chemical Formula (1)

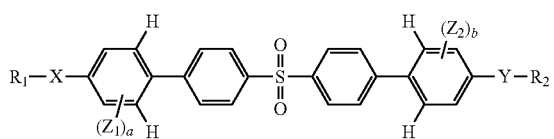

In the chemical formula (1), each of X and Y is a substituent selected from the substituents listed below.

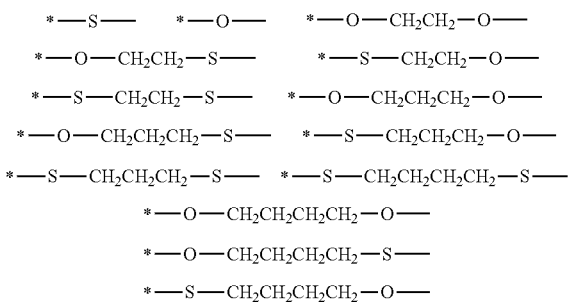

(where * represents atomic bonding with $R_1$ or $R_2$)

In the chemical formula (1), each of $R_1$ and $R_2$ represents a substituent selected from a hydrogen atom, an alkyl group having one or two carbon atoms and a (meth)acryloyl group (referring to an acryloyl group or a methacryloyl group hereinafter) and each of $Z_1$ and $Z_2$ represents a substituent selected from a hydrogen atom, a halogen atom, an alkoxy group having one or two carbon atoms, an alkylthio group having one or two carbon atoms, an unsubstituted alkyl group having one or two carbon atoms and substituents expressed by the chemical formula (2) shown below.

Chemical Formula (2)

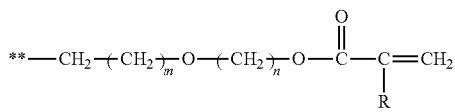

(where ** represents atomic bonding and m represents 0 or 1, while n represents an integer from 2 to 4 and R represents a hydrogen atom or a methyl group.)

In the chemical formula (1), each of a and b represents an integer from 0 to 2. When a is 2, the two $Z_1$s may be the same or different from each other. When b is 2, the two $Z_2$s may be the same or different from each other.

The smallest film thickness of the optical resin layer 2 is not less than 10 μm and the largest film thickness thereof is not more than 3 mm. In other words, the film thickness of the optical resin layer 2 is desirably not less than 10 μm and not more than 3 mm. When the film thickness is less than 10 μm, the chromatic aberration correcting feature of the optical element 1 may not be satisfactory. When, on the other hand, the film thickness exceeds 3 mm, stress distribution can arise in the film thickness direction to give rise to cracks. The film thickness of the optical resin layer 2 may typically be 1 mm at the center and 100 μm at the outer peripheral edge thereof.

The bonding layer 3 is a layer that is arranged on the optical resin layer 2 so as to bond the optical resin layer 2 and the second base member 4 together. The bonding layer 3 is made of a resin material that is selected to maximize the force that bonds the optical resin layer 2 and the second base member 4 together. The type of the resin material of the bonding layer 3 is not subject to any particular limitations and may be a thermosetting resin material or a light curable resin material. However, the use of a light curable resin material is preferable because a simple manufacturing method can be used for manufacturing the optical element and the bonding layer is not remarkably deformed during the optical element manufacturing process when alight curable resin material is selected for the bonding layer 3.

The modulus of elasticity of the bonding layer 3 is desirably remarkably smaller than the modulus of elasticity of the optical resin layer 2. More specifically, the modulus of elasticity of the bonding layer 3 is desirably less than ⅕ of the modulus of elasticity of the optical resin layer 2. When the modulus of elasticity of the bonding layer 3 is remarkably smaller than the modulus of elasticity of the optical resin layer 2, the stress that can arise in the optical resin layer 2 and the bonding layer 3 can be reduced if they are deformed due to changes in the environmental temperature. The modulus of elasticity of the bonding layer 3 is preferably not less than 100 MPa and not more than 1 GPa.

The film thickness of the bonding layer 3 is preferably within the range between 1 μm and 100 μm. The film thickness of the bonding layer 3 is the thickness of the bonding layer 3 in the surface normal direction relative to the surface of the bonding layer 3 where it contacts the second base member 4. When the (film) thickness of the bonding layer 3 is less than 1 the stress dispersing effect of the bonding layer 3 cannot satisfactorily be obtained. When, on the other hand, the (film) thickness of the bonding layer 3 exceeds 100 μm, the bonding layer 3 expands and contracts remarkably in response to changes in the environmental temperature to give rise to a risk of adversely affecting the performance of the optical element.

Figure 2:
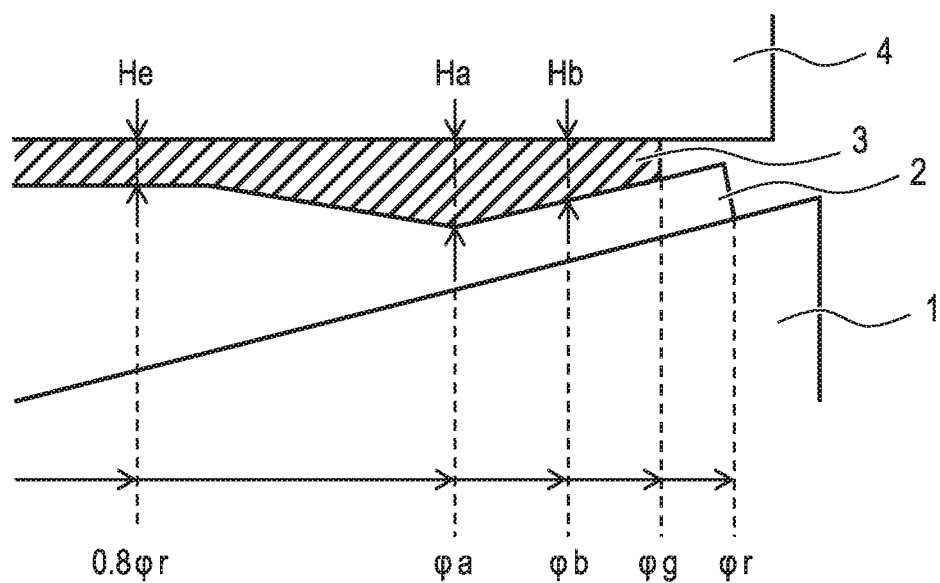
FIG. 2 is a schematic cross-sectional view of an outer peripheral part of a composite optical element according to the present invention.

FIG. 2 is a schematic cross-sectional view of a peripheral part of a composite optical element according to the present invention. While the outer diameter of the first base member 1 and that of the second base member 4 are not subject to any particular limitations, they are typically not less than 5 mm and not more than 100 mm. The outer diameter φr of the optical resin layer 2 is smaller than the outer diameter of the first base member 1 and preferably not less than 90% and not more than 99% of the outer diameter of the first base member 1. The outer diameter φg of the bonding layer 3 is smaller than the outer diameter φr of the optical resin layer 2 and preferably not less than 90% and not more than 99% of φr. The diameter φa and the diameter φB (φa<φb) are so selected that they are greater than 0.8 φr, which is the outer diameter of the optically utilizable region of the optical element, and do not exceed the outer diameter φg of the bonding layer 3 and that, when the thicknesses of the bonding layer 3 on the respective circles with diameters of 0.8 φr, φa and φb are He, Ha and Hb, the bonding layer 3 is so formed that it satisfies the requirement of He<Ha and also the requirement that Ha is greater than the thickness of the bonding layer 3 at the outer peripheral edge thereof. Note that the value of φa is found between the value of 0.8 φr and the value of φb and preferably not less than 81% and not more than 95% of the value of φr. Additionally, the value of φb is found between the value of φa and the value of φg (and may be equal to φg) and preferably not less than 85% and not more than 98% of the value of φr. Each of He, Ha and Hb is preferably not less than 1 μm and not more than 100 Furthermore, preferably the requirement of 1.2<Ha and also the requirement that Ha is greater than 1.2 times of the thickness of the bonding layer 3 at the outer peripheral edge thereof are satisfied.

While the film thicknesses and the profile of the bonding layer 3 that satisfy the above-described requirements can be obtained by processing the surface of the second base member 4 that contacts the bonding layer 3, they can more easily be obtained by processing the metal mold at the part thereof that defines the surface of the optical resin layer 2 to be brought into contact with the bonding layer 3 and subsequently transferring the profile of the processed metal mold onto the optical resin layer 2.

[Manufacturing of Optical Element]

While there are no particular limitations to the method of manufacturing an optical element according to the present invention, an exemplar method of manufacturing a composite optical element (lens) comprising a pair of glass-made base members, an optical resin layer 2 and a bonding layer 3, of which the optical resin layer 2 and the bonding layer 3 are formed by using respective light curable materials and sandwiched between the pair of base members 1 and 4, will be described below.

While the profile of each of the glass-made base members is not subject to any particular limitations, when the composite optical element to be manufactured is a lens, a plate-shaped member having a light entering/exiting surface selected from a concave surface, a convex surface, an axisymmetric aspherical surface, a flat surface or the like at one or both of the surfaces thereof can be employed for each of them. While the profile of each of the glass-made base members may be selected from various possible profiles, the use of a circular profile is preferable when the composite optical element to be manufactured is a lens. The glass-made base members can be manufactured by cutting, grinding, polishing, press molding or the like.

The glass-made base members are preferably preprocessed on the surfaces thereof to be brought into tight contact respectively with the optical resin materials. For the purpose of preprocessing the glass surfaces, a coupling process using any of various silane coupling agents having good affinity to resin materials can suitably be employed. Specific examples of coupling agents that can be used for the preprocessing include hexamethyl disilazane, methyl trimethoxy silane, trimethyl chlorosilane and triethyl chlorosilane.

Figure 3A:
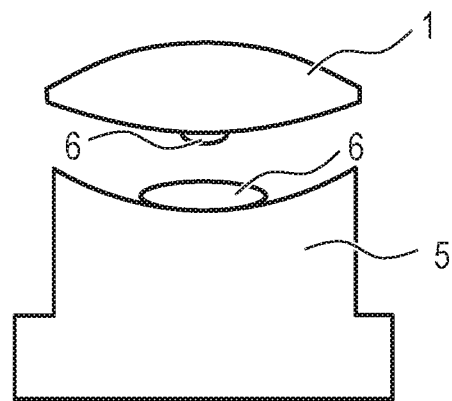
FIGS. 3A, 3B, 3C, 3D and 3E are a schematic illustration of a method of manufacturing a composite optical element according to the present invention, showing different manufacturing steps thereof.
Figure 3C:
Figure 3B:
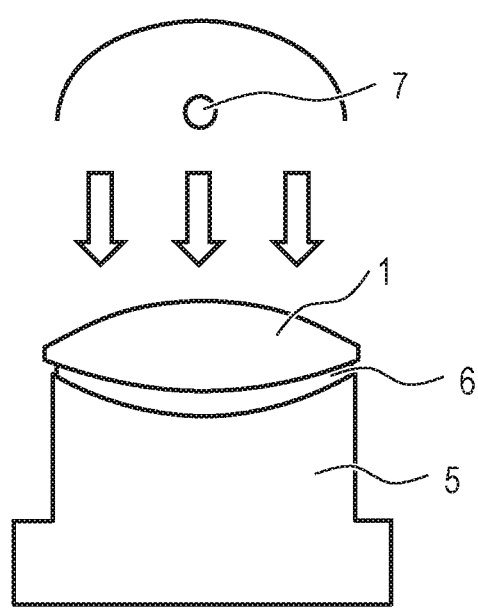
Figure 3D:
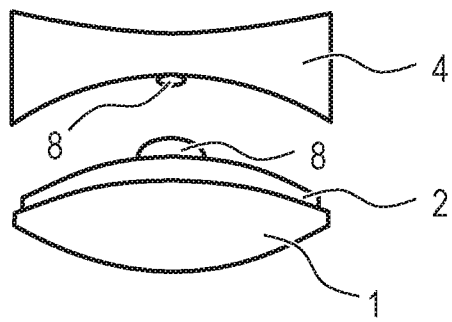
Figure 3E:
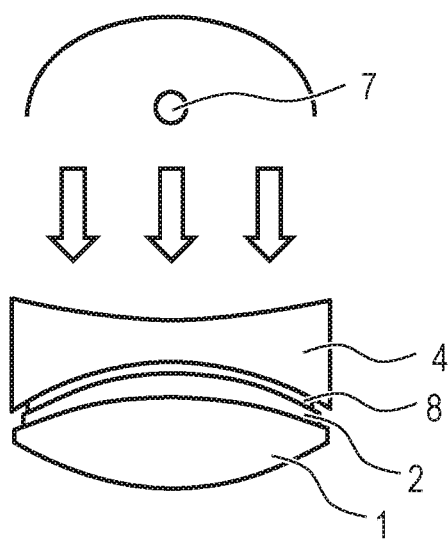

To begin with, a light curable resin material 6 is placed between the first glass-made base member 1 and a metal mold 5 for molding as shown in FIG. 3A. The metal mold 5 to be used here has a surface showing the inverted profile of the intended surface profile of the optical element. For example, such an inverted profile can be produced by cutting the metal mold 5 by means of a precision processing machine. The metal mold is typically prepared by plating a metal base material, which base material may be stainless steel or steel, by NiP plating or oxygen-free cupper plating. Then, the light curable resin material 6 and the first glass-made base member 1 on the metal mold 5 is irradiated with UV rays from the side of the first glass-made base member 1 by means of a UV ray source 7 to set the light curable resin material 6 as shown in FIG. 3B. Thereafter, an intermediate product of optical element, in which an optical resin layer 2 is laid on and integrated with the first glass-made base member 1, can be obtained by releasing the cured light curable resin material 6 from the metal mold 5 as shown in FIG. 3C. Subsequently, as shown in FIG. 3D, an adhesive agent 8 for forming the optical element is placed between the optical resin layer of the obtained intermediate product of optical element and the second glass-made base member 4 for molding. Then, all the components of the composite optical element that are put together are irradiated with UV rays from the side of the second glass-made base member 4 by means of the UV ray source 7 to set the adhesive agent 8, as shown in FIG. 3E. As a result, the composite optical element in which the first glass-made base member 1, the optical resin layer 2, the bonding layer 3 and the second glass-made base member 4 are subsequently laid in the above-mentioned order as shown in FIG. 1 is obtained. As post-processing, a thermal annealing operation, an operation of additional irradiation of UV rays, a heating and/or UV rays irradiating operation in an oxygen-free environment and/or some other operation may be executed for the purpose of relaxation of the residual stress after the molding process.

[Optical Devise]

Specific examples of application of a composite optical element according to the present invention include a lens for forming an optical devise (imaging optical system) to be used for a camera or a video camera and a lens for forming an optical devise (projection optical system) to be used for a liquid crystal projector. Such optical systems comprise a casing and a plurality of lenses arranged in the casing and a composite optical element according to the present invention may be used for at least one of those plurality of lenses.

[Imaging Apparatus]

Figure 4:
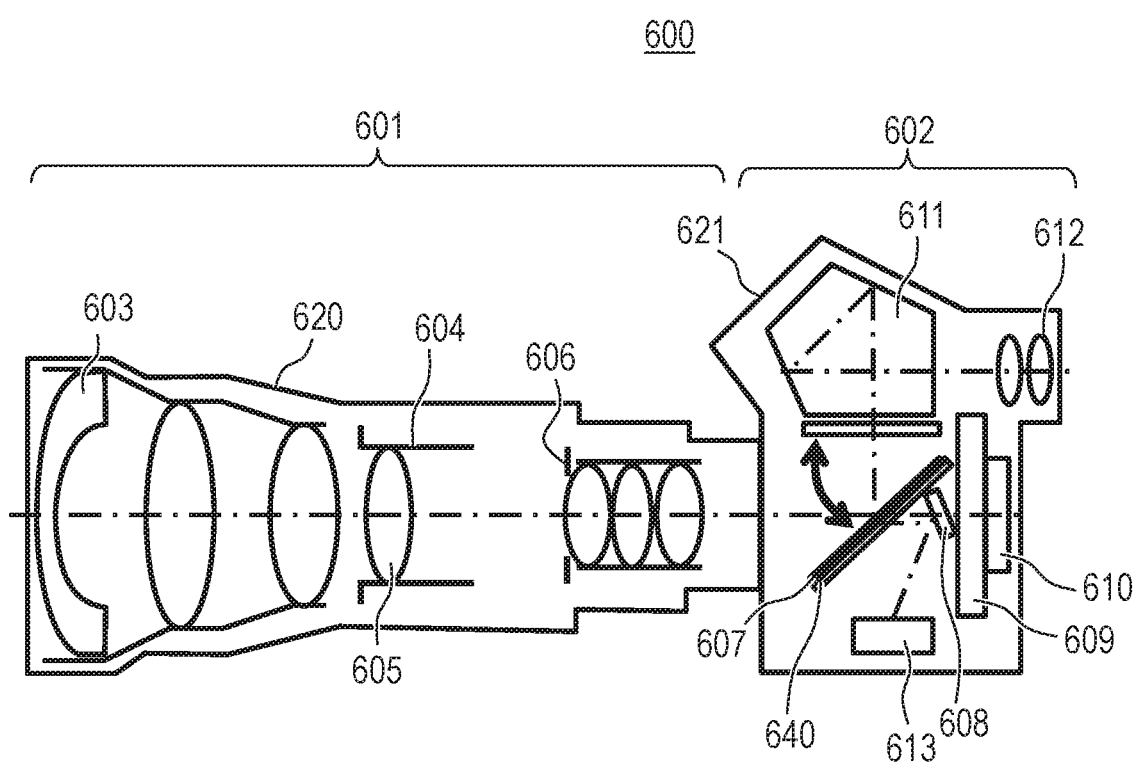
FIG. 4 is a schematic cross-sectional view of an imaging apparatus formed by using one or more composite optical elements according to the present invention.

FIG. 4 is a schematic cross-sectional view of an embodiment of imaging apparatus suitably formed by using a composite optical element according to the present invention, showing the configuration thereof. This embodiment is a digital single-lens reflex camera 600. While a camera main body 602 and a lens barrel 601, which is an optical apparatus, are connected to each other in FIG. 4, the lens barrel 601 is a so-called interchangeable lens barrel that is detachably connected to the camera main body 602.

The rays of light coming from the target of shooting by the camera 600 are picked up by the optical system including a plurality of lenses 603, 605 arranged on the optical axis of the imaging optical system in a casing 620 of the lens barrel 601. An optical element according to the present invention can be used, for example, for the lens 603 and also for the lens 605. Note that the lens 605 is supported by an inner cylinder 604 such that the inner cylinder 604 supporting the lens 605 can be moved relative to the outer cylinder of the lens barrel 601 for the purpose of focusing and zooming.

In the observation period that comes before a target shooting operation, the rays of light coming from the target are reflected by a main mirror 607 in the casing 621 of the camera main body 602 and, after passing through the prism 611, produce the image to be picked up by the camera shooting person by way of a finder lens 612. The main mirror 607 may typically be a half mirror and the rays of light that pass through the main mirror are reflected toward an AF (autofocus) unit 613 by a sub-mirror 608 and typically employed for ranging. The main mirror 607 is mounted on and bonded to a main mirror holder 640 so as to be supported by the main mirror holder 640. For a target shooting operation, the main mirror 607 and the sub-mirror 608 are moved away from the light path by means of a drive mechanism (not shown) and a shutter 609 is opened to allow an image pickup element 610 to receive the rays of light that entered from the lens barrel 601 and passed the imaging optical system and form an optical image to be picked up. An aperture 606 is arranged to vary the aperture area and adjust the brightness and the depth of focus in the shooting operation.

While an imaging apparatus formed by using an optical element according to the present invention is described above in terms of a digital single-lens reflex camera, an optical element according to the present invention can also be used for a smartphone, a compact digital camera or the like.

EXAMPLES

Now, the present invention will be described further by way of examples.

In each of the following examples, an optical element according to the present invention was prepared by means of the method that will be described below and the obtained optical element was evaluated for optical performance and environment resistance by the method that will also be described below.

Example 1

To begin with, the method of manufacturing an optical element as illustrated in FIG. 1 will be described below. A piece of glass material (S-FPM2: trade name, available from OHARA) was processed to make it show a biconvex spherical profile with φ42 mm and the processed piece was employed for the first base member 1. The spherical profile of each of the opposite surfaces of the first base member 1 was made to show a radius of 78.0 mm. A piece of glass material (S-NBH53: trade name, available from OHARA) was processed to make it show a biconcave spherical profile with φ39 mm and the processed piece was employed for the second base member 4. The spherical profile of each of the opposite surfaces of the second base member 4 was made to show a radius of 57.0 mm. The metal mold 5 (see FIGS. 3A and 3B) of this example was prepared by oxygen-free copper plating a stainless steel-made base member and subsequently cutting it by means of a diamond bit. It showed the inverted profile of the intended profile of the optical resin layer 2. The profile of the optical resin layer 2 was such that the film thickness of the optical resin layer 2 at the center thereof was 1.00 mm and the smallest film thickness of the optical resin layer 2 at the peripheral edge thereof was 0.05 mm, while the distance from the center to the outer peripheral edge was 20.0 mm.

Firstly, a light curable resin material 6 (see FIGS. 3A and 3B) was applied to the first glass-made base member 1 and also to the metal mold 5 by means of a dispenser (SMP-3: trade name, available from MUSASHI Engineering). An acrylic resin material whose modulus of elasticity after curing was 3.5 GPa was employed for the light curable resin material. Subsequently, a jig for accurately setting up the positional relationship between the first glass-made base member 1 and the metal mold 5 was prepared and the first glass-made base member 1 and the metal mold 5 were placed in position. Then, the first glass-made base member 1 was moved closer to the metal mold 5 to fill the gap between them with a light curable resin material such that the distance from the center to the outer periphery of the resin material layer becomes 20.0 mm. Thereafter, the resin material was irradiated with UV rays through the first glass-made base member 1 from a UV ray source 7 to form the optical resin layer 2 on the first glass-made base member 1. UV rays were irradiated with a dose of 10 J. Then, the optical resin layer 2 was released from the metal mold 5.

After releasing the optical resin layer 2 from the metal mold 5, UV rays were irradiated onto the optical resin layer 2, while the optical resin layer 2 was being vacuum-heated under the conditions of a degree of vacuum of 10 Pa and a temperature of 90° C. for two hours, in order to accelerate the curing of the optical resin layer 2. UV rays were irradiated with a dose of 10 J. The optical resin layer 2 showed a thickness of 1 mm at the center thereof and a thickness of 100 μm at the outer peripheral edge thereof.

Then, a photosetting adhesive agent 8 (see FIGS. 3D and 3E) was applied to both the optical resin layer 2 and the second glass-made base member 4 by means of the dispenser. An adhesive agent (WR8807LK: trade name, available from KYORITSU CHEMICAL) whose modulus of elasticity after curing was 0.17 GPa was employed for the adhesive agent 8. Subsequently, the second glass-made base member 4 was arranged oppositely relative to the optical resin layer 2 and moved closer to the optical resin layer 2 and the photosetting adhesive agent 8 was filled into the gap between the second glass-made base member 4 and the optical resin layer 2 to make the photosetting adhesive agent 8 show a thickness of 0.02 mm at the center thereof. Thereafter, the adhesive agent 8 was set by irradiating UV rays from the side of the second glass-made base member 4 to produce the bonding layer 3. UV rays were irradiated with a dose of 10 J. Finally, the first glass-made base member 1, the optical resin layer 2, the bonding layer 3 and the second glass-made base member 4 that were put together were put into an oven and heated at a temperature of 100° C. for two hours to produce the finished composite optical element of Example 1.

FIG. 2 shows the profile of the optical element and the thickness of the bonding layer 3. Referring to FIG. 2, φa, φb, φg and φr were respectively 36.0 mm, 38.0 mm, 38.6 mm and 40.0 mm and He, Ha and Hb were respectively 0.020 mm, 0.060 mm and 0.030 mm. The film thickness was found to be continuously decreasing from Hb toward the outer peripheral edge.

Example 2

The optical element of Example 2 was prepared as in Example 1 except that He was made to be equal to 0.020 mm, Ha was made to be equal to 0.024 mm and Hb was made to be equal to 0.020 mm for the film thickness of the bonding layer 3. Additionally, the film thickness of the bonding layer 3 was found to be continuously decreasing from Hb toward the outer peripheral edge thereof.

Example 3

The optical element of Example 3 was prepared as in Example 1 except that He was made to be equal to 0.020 mm, Ha was made to be equal to 0.100 mm and Hb was made to be equal to 0.030 mm for the film thickness of the bonding layer 3. Additionally, the film thickness of the bonding layer 3 was found to be continuously decreasing from Hb toward the outer peripheral edge thereof.

Example 4

The optical element of Example 4 was prepared as in Example 1 except that an acrylic resin material whose modulus of elasticity was made to be equal to 0.9 GPa was employed for the optical resin layer 2. Additionally, the film thickness of the bonding layer 3 was found to be continuously decreasing from Hb toward the outer peripheral edge thereof.

Comparative Example 1

The optical element of Comparative Example 1 was prepared as in Example 1 except that He was made to be equal to 0.020 mm and the film thickness outside He was made to be constant and equal to 0.020 mm so that Ha and Hb were non-existent.

Comparative Example 2

The optical element of Comparative Example 2 was prepared as in Example 1 except that He was made to be equal to 0.020 mm, Ha was made to be equal to 0.080 mm and the film thickness outside Hb was made to be constant and equal to 0.080 mm so that Hb was non-existent.

Comparative Example 3

The optical element of Comparative Example 3 was prepared as in Example 1 except that He was made to be equal to 0.080 mm and the film thickness outside He was constantly less than He so that Ha was non-existent, while Hb was made to be equal to 0.020 mm. Additionally, the film thickness of the bonding layer 3 was found to be continuously decreasing from Hb toward the outer peripheral edge thereof.

Comparative Example 4

The optical element of Comparative Example 4 was prepared as in Example 1 except that He, Ha and Hb were respectively made to be equal to 0.020 mm, 0.150 mm and 0.030 mm. Additionally, the film thickness of the bonding layer 3 was found to be continuously decreasing from Hb toward the outer peripheral edge thereof.

Comparative Example 5

The optical element of Comparative Example 5 was prepared as in Example 1 except that $\phi g$ was made to be equal to 39.0 mm and $\phi r$ was made to be equal to 38.6 mm for the profile of the optical element. Additionally, the film thickness of the bonding layer 3 was found to be continuously decreasing from Hb toward the outer peripheral edge thereof.

The method of evaluating the optical elements prepared in the examples and the comparative examples will be described below.

[Evaluation of Optical Performance]

Imaging lenses were prepared respectively by incorporating the prepared optical elements into optical systems and connected to a camera on a one by one basis and a plate that bore stripes of three colors of RGB was shot by the camera for each of the colors to obtain a photograph of the plate. Each of the taken pictures was compared with the plate and the value of the resolution of the color of the picture was measured by means of image processing software. When the measured chromatic aberration exceeded the predetermined reference value, rating of B was given to the optical performance of the optical element employed to take the picture. When, on the other hand, the measured chromatic aberration was less than the predetermined reference value, rating of A was given to the optical performance of the optical element.

[Evaluation of Environmental Resistance]

Each of the prepared optical elements was put into a constant temperature oven, in which the temperature was held at 80° C., for two hours. Subsequently, the optical element was taken out from the constant temperature oven and left still for a period of not less than two hours. Thereafter, if there was any mutual separation of the optical resin layer 2 and the bonding layer 3 at the peripheral edge of the optical element or not was observed at room temperature (23° C.±2° C.) by way of an optical microscope. When mutual separation of the optical resin layer 2 and the bonding layer 3 was observed, rating of B was given to the environmental resistance of the optical element. When, on the other hand, no mutual separation of the optical resin layer 2 and the bonding layer 3 was observed, rating of A was given to the environmental resistance of the optical element.

The manufacturing conditions and the results of the evaluations of the prepared optical elements were listed in Table 1 shown below.

TABLE 1

| | Modulus of elasticity (GPA) | | Optical element profile (mm) | | | | | | | | Evaluation | | |
|---|---|---|---|---|---|---|---|---|---|---|---|---|---|
| | Optical resin layer | Bonding layer | 0.8 $\phi r$ | $\phi a$ | $\phi b$ | $\phi g$ | $\phi r$ | He | Ha | Hb | Optical performance | Environmental resistance | Total rating |
| Example 1 | 3.5 | 0.17 | 32.0 | 36.0 | 38.0 | 38.6 | 40.0 | 0.020 | 0.060 | 0.030 | A | A | A |
| Example 2 | 3.5 | 0.17 | 32.0 | 36.0 | 38.0 | 38.6 | 40.0 | 0.020 | 0.024 | 0.020 | A | A | A |
| Example 3 | 3.5 | 0.17 | 32.0 | 36.0 | 38.0 | 38.6 | 40.0 | 0.020 | 0.100 | 0.030 | A | A | A |
| Example 4 | 0.9 | 0.17 | 32.0 | 36.0 | 38.0 | 38.6 | 40.0 | 0.020 | 0.060 | 0.030 | A | A | A |

TABLE 1-continued

| | Modulus of elasticity (GPA) | | Optical element profile (mm) | | | | | | | | Evaluation | | |
|---|---|---|---|---|---|---|---|---|---|---|---|---|---|
| | Optical resin layer | Bonding layer | 0.8 φr | φa | φb | φg | φr | He | Ha | Hb | Optical performance | Environmental resistance | Total rating |
| Comparative Example 1 | 3.5 | 0.17 | 32.0 | — | — | 38.6 | 40.0 | 0.020 | — | — | A | B | B |
| Comparative Example 2 | 3.5 | 0.17 | 32.0 | 36.0 | — | 38.6 | 40.0 | 0.020 | 0.080 | — | A | B | B |
| Comparative Example 3 | 3.5 | 0.17 | 32.0 | — | 38.0 | 38.6 | 40.0 | 0.080 | — | 0.020 | B | A | B |
| Comparative Example 4 | 3.5 | 0.17 | 32.0 | 36.0 | 38.0 | 38.6 | 40.0 | 0.020 | 0.150 | 0.030 | B | A | B |
| Comparative Example 5 | 3.5 | 0.17 | 32.0 | 36.0 | 38.0 | 39.0 | 38.6 | 0.020 | 0.060 | 0.030 | A | B | B |

Rating of A was given to an optical element that obtained rating of A for both of the optical performance and the environmental resistance. Rating of B was given to an optical element that obtained rating of B for either of the optical performance and the environmental resistance. As clearly seen from Table 1, the present invention provided optical elements that had a small outer diameter and showed excellent environmental resistance.

Effect of the Invention

Thus, the present invention can provide an optical element that has a small outer diameter and still shows excellent environmental resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-015785, filed Jan. 31, 2019, and No. 2019-222942, filed Dec. 10, 2019, which are hereby incorporated by reference herein in their entirety.

What is claimed is:

1. A composite optical element comprising:
a first base member having a light entering/exiting surface extending from a center, the center being aligned with the optical axis of the optical element, to an outer periphery thereof;
an optical resin layer extending from the center to an outer periphery thereof;
a bonding layer extending from the center to an outer periphery thereof; and
a second base member having a light entering/exiting surface extending from the center to an outer periphery thereof;
the first base member, the optical resin layer, the bonding layer and the second base member being sequentially laminated in the above-described order;
the optical resin layer and the bonding layer being sandwiched between the light entering/exiting surface of the first base member and the light entering/exiting surface of the second base member,
wherein
the bonding layer has a thickness which changes along a straight line extending from the center toward the outer periphery of the bonding layer, the thickness being greater at an intermediate position located between a first position and a second position than at the first position and at the second position, the first position corresponding to a point apart from the center by 0.8 times a distance to the outer periphery of the optical resin layer from the center, the second position corresponding to the outer periphery of the bonding layer.

2. The composite optical element according to claim 1, wherein
the thickness of the bonding layer at the intermediate position is greater than 1.2 times the thickness at the first position and is greater than 1.2 times the thickness at the second position.

3. The composite optical element according to claim 1, wherein
the first position and the intermediate position are respectively provided in a ring.

4. The composite optical element according to claim 1, wherein
the first position and the intermediate position are located outside the optically effective region of the composite optical element.

5. The composite optical element according to claim 1, wherein
the thickness of the bonding layer is within a range not smaller than 1 μm and not greater than 100 μm.

6. The composite optical element according to claim 1, wherein
the modulus of elasticity of the bonding layer is not greater than ⅕ of the modulus of elasticity of the optical resin layer.

7. The composite optical element according to claim 1, wherein
the optical resin layer has an uneven thickness with a smallest value of not less than 10 μm and a largest value of not more than 3 mm.

8. The composite optical element according to claim 1, wherein
the thickness of the bonding layer continuously changes from the intermediate position to the second position.

9. An optical apparatus comprising a casing and an optical system including a plurality of lenses arranged in the casing, wherein
at least one of the plurality of lenses is a composite optical element according to claim 1.

10. An imaging apparatus comprising a casing, an optical system including a plurality of lenses arranged in the casing, and an image pickup element for receiving light after passing through the optical system, wherein
at least one of the plurality of lenses is a composite optical element according to claim 1.

11. The imaging apparatus according to claim 10, wherein the imaging apparatus is a camera.

* * * * *